US008194114B2

(12) United States Patent
Barry et al.

(10) Patent No.: US 8,194,114 B2
(45) Date of Patent: Jun. 5, 2012

(54) HIGH DEFINITION VIDEO CONFERENCE SYSTEM

(75) Inventors: Lam Barry, Tao Yuan Shien (TW); Leung Chee-Chun, Tao Yuan Shien (TW); Chang Chia-Yuan, Taichung (TW); Hsu Hsueh-Cheng, Tao Yuan Shien (TW)

(73) Assignee: Quanta Computer Inc. (TW)

( * ) Notice: Subject to any disclaimer, the term of this patent is extended or adjusted under 35 U.S.C. 154(b) by 1238 days.

(21) Appl. No.: 11/984,157

(22) Filed: Nov. 14, 2007

(65) Prior Publication Data

US 2008/0303889 A1 Dec. 11, 2008

(30) Foreign Application Priority Data

Jun. 11, 2007 (TW) .............................. 96121059 A (51) Int. Cl.
*H04N 7/14* (2006.01)
(52) U.S. Cl. .................................. 348/14.01; 348/14.07
(58) Field of Classification Search ............... 381/14.01, 381/14.02, 14.03, 14.04, 14.07, 14.08, 14.09; 348/14.01, 14.02, 14.03, 14.04, 14.07, 14.08, 348/14.09, 14.05, 14.06, 14.1–14.16; 379/201.01, 379/202.01; 370/260–271
See application file for complete search history.

(56) References Cited

U.S. PATENT DOCUMENTS 7,631,039 B2* 12/2009 Eisenberg ..................... 370/259
7,692,683 B2* 4/2010 Kenoyer et al. ............ 348/14.08
2002/0118809 A1 8/2002 Eisenberg
2004/0008423 A1 1/2004 Driscoll
2006/0158509 A1* 7/2006 Kenoyer et al. ............ 348/14.08

FOREIGN PATENT DOCUMENTS

CN 1433222 7/2003
CN 1972431 5/2007

OTHER PUBLICATIONS

English Translation of CN1433222.
English Translation of CN1972431.
Office Action in related Taiwan Application dated Oct. 29, 2010.
English Translation of Office Action in related Taiwan Application No. 096121059.
Office Action in related Taiwan Application dated Mar. 22, 2011.
English Translation of Office Action in related Taiwan Application.

* cited by examiner

*Primary Examiner* — Brian Ensey
(74) *Attorney, Agent, or Firm* — Thomas, Kayden, Horstemeyer & Risley, LLP.

(57) ABSTRACT

The invention discloses a high definition video conference system comprising a plurality of transmitting terminals and a receiving terminal. Each transmitting terminal comprises a digital imaging/processing apparatus and a first data processing apparatus. The receiving terminal comprises a second data processing apparatus and at least one display apparatus. The digital imaging/processing apparatus is used for capturing an image of a participant and for compressing the captured image into a high definition image. According to a standard communication protocol, the first data processing apparatus converts the high definition image into a standard-format communication image and then transmits the standard-format communication image. The second data processing apparatus is used for receiving and decoding the standard-format image transmitted from each transmitting terminal into the high definition image. Accordingly, the high definition can be displayed on the display apparatus.

7 Claims, 6 Drawing Sheets

HIGH DEFINITION VIDEO CONFERENCE SYSTEM

BACKGROUND OF THE INVENTION

1. Field of the Invention

The invention relates to a high definition video conference system and, more particularly, to a high definition video conference system capable of providing high definition image in real time.

2. Description of the Prior Art

Recently, video conference has become an important tool for remotely communicating with each other because of the development of network technology. However, since the video conference is restricted to hardware structure and network transmission bandwidth, the image is always displayed with bad quality.

In general, the image data usually has the characteristic of large amount of data; however, the amount of transmission data would be restricted by the transmission limit of network bandwidth. Therefore, in order to reduce the amount of image data, the original data of images usually would be compressed in the transmitting terminal first and then be reduced to acceptable range under network bandwidth. Afterward, the receiving terminal receives and decodes the compressed images to restore the images. However, the calculation for compressing images is very huge, so the conventional central processing unit (CPU) is not capable of real-time compressing high definition image. In other words, all of the conventional video conference systems could not provide high definition images in real time, and the application of video conference system is limited.

Accordingly, the scope of the invention is to provide a high definition video conference system capable of providing high definition image in real time to solve the aforesaid problems.

SUMMARY OF THE INVENTION

A scope of the invention is to provide a high definition video conference system capable of providing high definition image in real time.

According to a preferred embodiment, the high definition video conference system of the invention comprises a plurality of transmitting terminals and a receiving terminal. Each transmitting terminal comprises a digital imaging/processing apparatus and a first data processing apparatus. The receiving terminal comprises a second data processing apparatus and at least one display apparatus.

In this embodiment, the digital imaging/processing apparatus is used for capturing an image associated with a participant and compressing the captured image into a high definition image. The first data processing apparatus is used for converting the high definition image into a standard-format communication image according to a standard communication protocol and then transmitting the standard-format communication image.

In another preferred embodiment, the digital imaging/processing apparatus also can be only used for capturing an image associated with a participant. Then, the first data processing apparatus compresses the image into a high definition image, converts the high definition image into a standard-format communication image according to a standard communication protocol, and transmits the standard-format communication image. And, it depends on practical applications.

The second data processing apparatus is used for receiving and decoding the standard-format communication image transmitted from each transmitting terminal into the high definition image. Finally, the high definition image could be displayed on the display apparatus. Accordingly, the high definition video conference system of the invention can easily provide high definition image in real time for multiple participants.

The advantage and spirit of the invention may be understood by the following recitations together with the appended drawings.

DETAILED DESCRIPTION OF THE INVENTION

Figure 1:
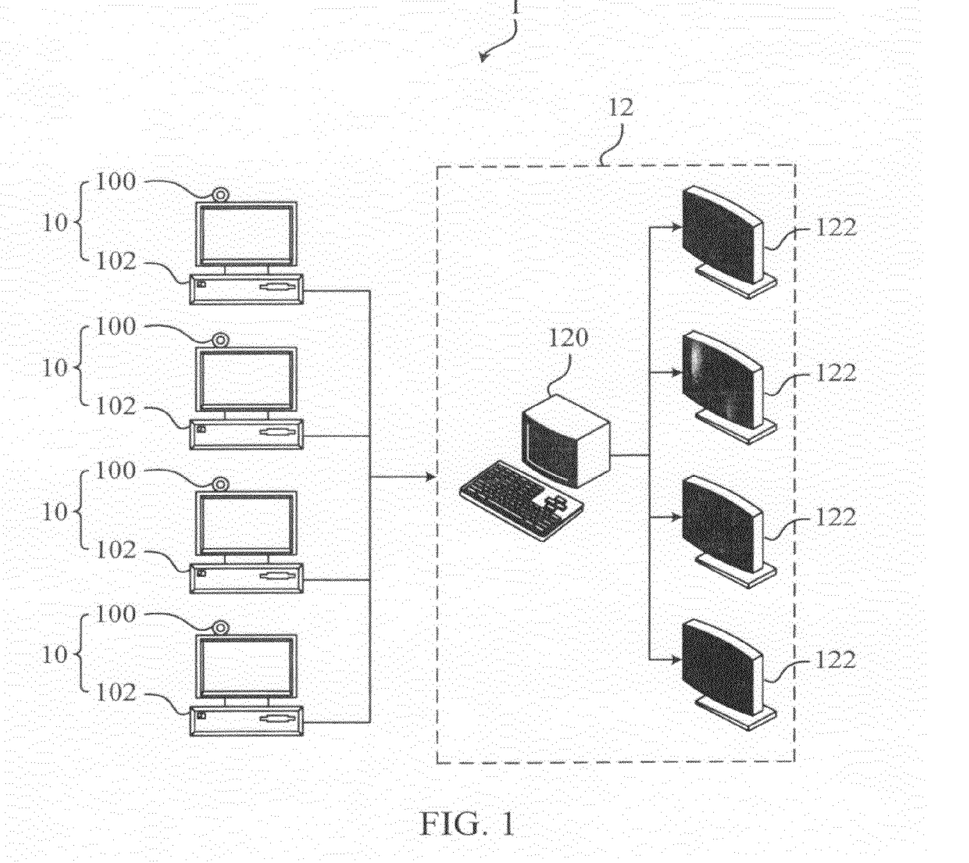
FIG. 1 is a schematic diagram illustrating a high definition video conference system according to one preferred embodiment of this invention.

Please refer to FIG. 1. FIG. 1 is a schematic diagram illustrating a high definition video conference system 1 according to a preferred embodiment of the invention. The high definition video conference system 1 comprises four transmitting terminals 10 and a receiving terminal 12. Each transmitting terminal 10 comprises a digital imaging/processing apparatus 100 and a first data processing apparatus 102. The receiving terminal 12 comprises a second data processing apparatus 120 and four display apparatuses 122. It should be noticed that the high definition video conference 1 shown in FIG. 1 is one embodiment only used for illustrating the invention. In other words, the amount of the transmitting terminal 10 and the display apparatus 122 would not be limited to four, and it depends on practical applications.

In this embodiment, the digital imaging/processing apparatus 100 is a video camera, the first data processing apparatus 102 and the second data processing apparatus 120 can be a computer, and the display apparatus 122 can be a monitor, a TV or the like.

The digital imaging/processing apparatus 100 is used for capturing an image associated with a participant and compressing the captured image into high definition image, such as MPEG-2, MPEG-4, H.264 standard, etc. The first data processing apparatus 102 converts the high definition image into a standard-format communication image according to a standard communication protocol and then transmits the standard-format communication image to the receiving terminal 12. In this embodiment, the standard-format communication protocol could be session initiation protocol, H.323 protocol, or the like.

Afterward, the second data processing apparatus 120 receives and decodes the standard-format communication image transmitted from each transmitting terminal 10 into the high definition image. Finally, the high definition image can be displayed on the display apparatus 122. Accordingly, the high definition video conference system 1 of the invention can easily provide high definition image in real time for multiple participants.

Figure 2:
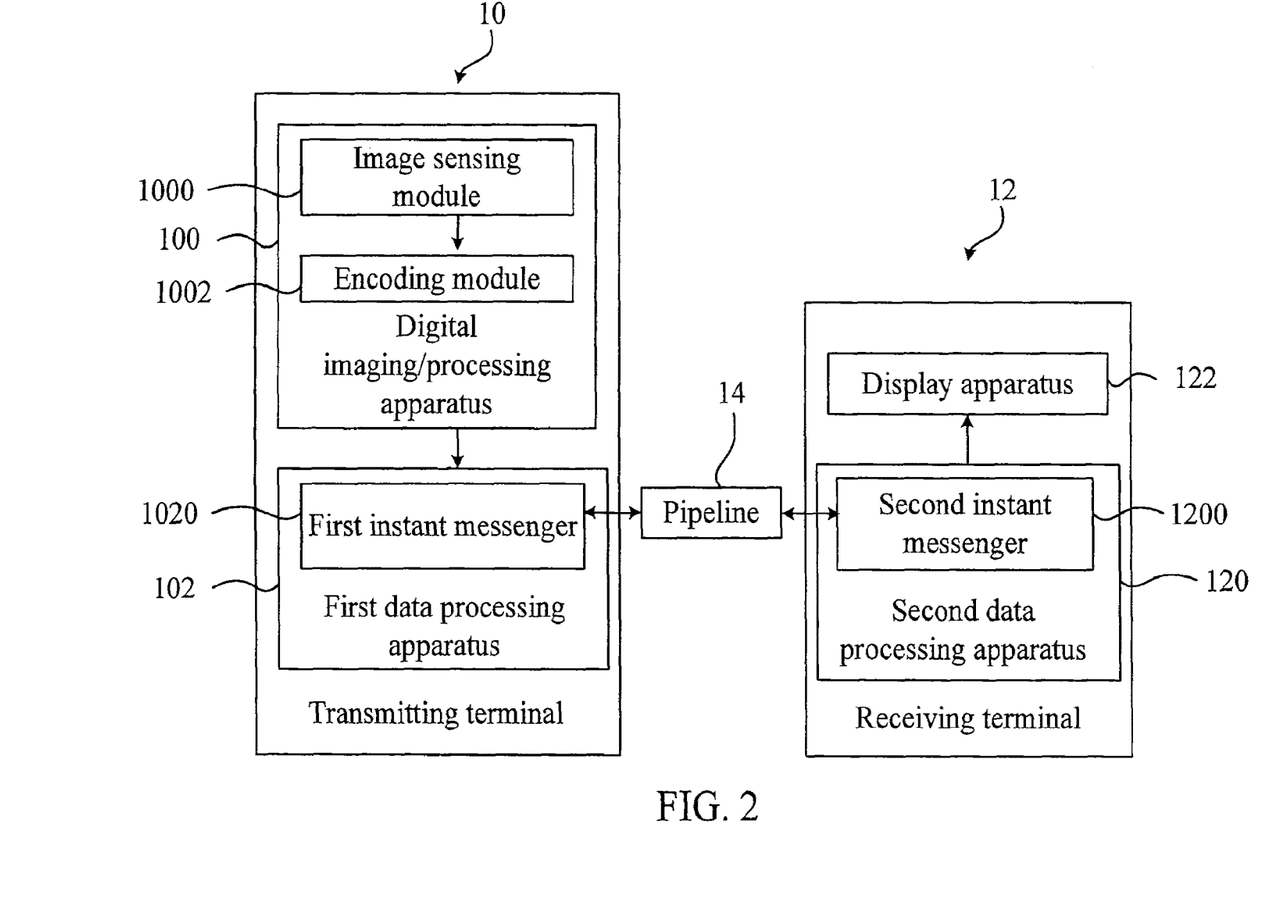
FIG. 2 is a functional block diagram illustrating the communication between the transmitting terminal and the receiving terminal depicted in FIG. 1.

Please refer to FIG. 2. FIG. 2 is a functional block diagram illustrating the communication between the transmitting terminal 10 and the receiving terminal 12 shown in FIG. 1. In this embodiment, the digital imaging/processing apparatus 100 comprises an image sensing module 1000 and an encoding module 1002. The image sensing module 1000 is used for sensing an image associated with a participant, and the encoding module 1002 compresses the captured image into high definition image based on a high definition compression standard, such as H.264 standard.

As shown in FIG. 2, the participants search for IP addresses of each other by using an instant messenger. Furthermore, a pipeline 14 is established between a first instant messenger 1020 of the first data processing apparatus 102 and a second instant messenger 1200 of the second data processing apparatus 120. Accordingly, the first data processing apparatus 102 can transmit the standard-format communication image to the second data processing apparatus 120 through the pipeline 14. The first instant messenger 1020 and the second instant messenger 1200 can be one selected from a group consisting of AOL Instant Messenger, Microsoft MSN Messenger, Yahoo! Messenger, ICQ, Jabber, Groove, and Sun JXTA.

Figure 3:
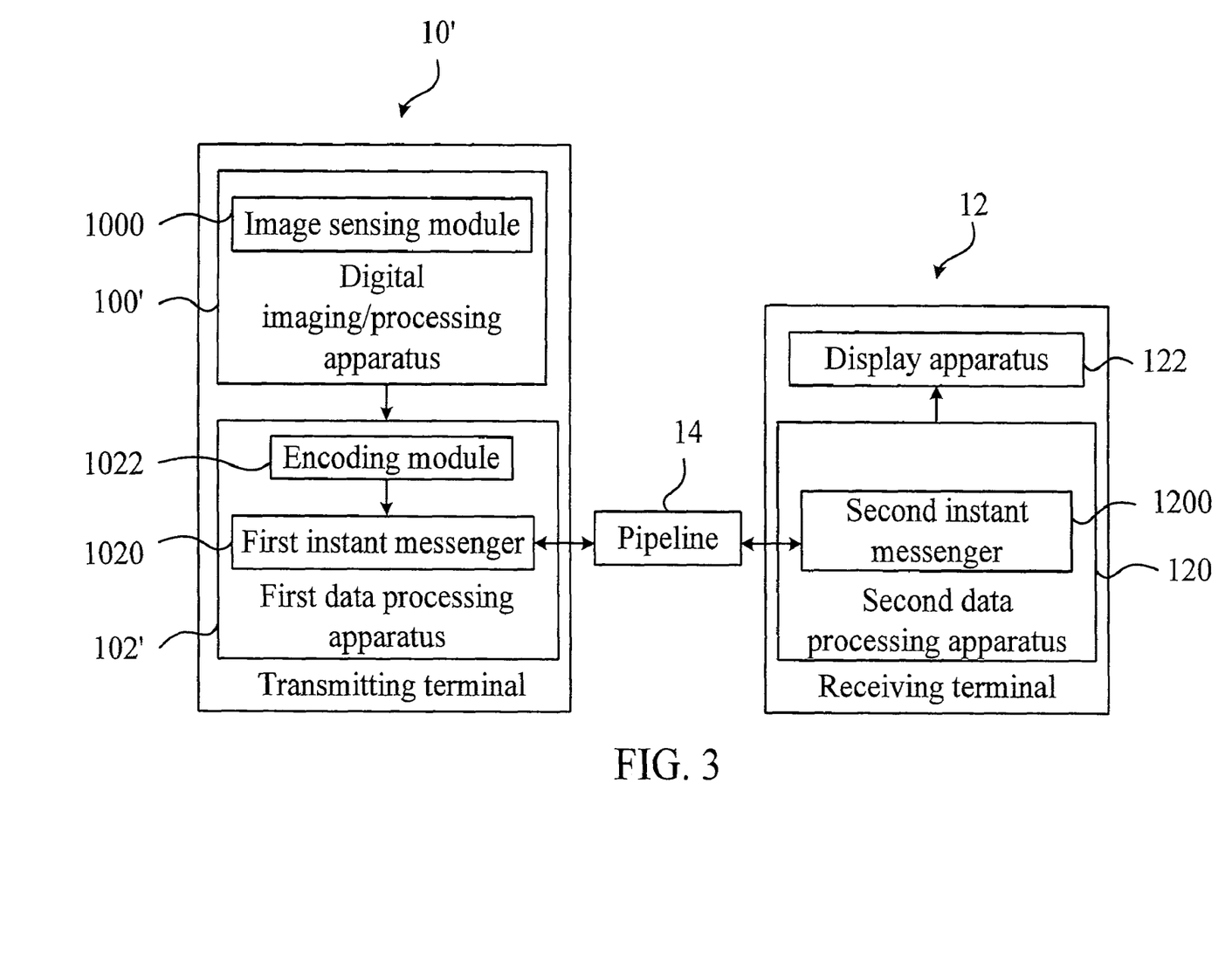
FIG. 3 is a functional block diagram illustrating the communication between the transmitting terminal and the receiving terminal according to another preferred embodiment of this invention.

Please refer to FIG. 3. FIG. 3 is a functional block diagram illustrating the communication between the transmitting terminal 10' and the receiving terminal 12 according to another preferred embodiment of the invention. In this embodiment, a digital imaging/processing apparatus 100' comprises an image sensing module 1000 and a first data processing apparatus 102' comprises an encoding module 1022. The image sensing module 1000 is used for sensing an image associated with a participant, and the encoding module 1022 compresses the captured image into high definition image based on a high definition compression standard, such as H.264 standard.

In other words, the encoding module could be embedded in the digital imaging/processing apparatus or the first data processing apparatus. And, that depends on practical applications.

Figure 4:
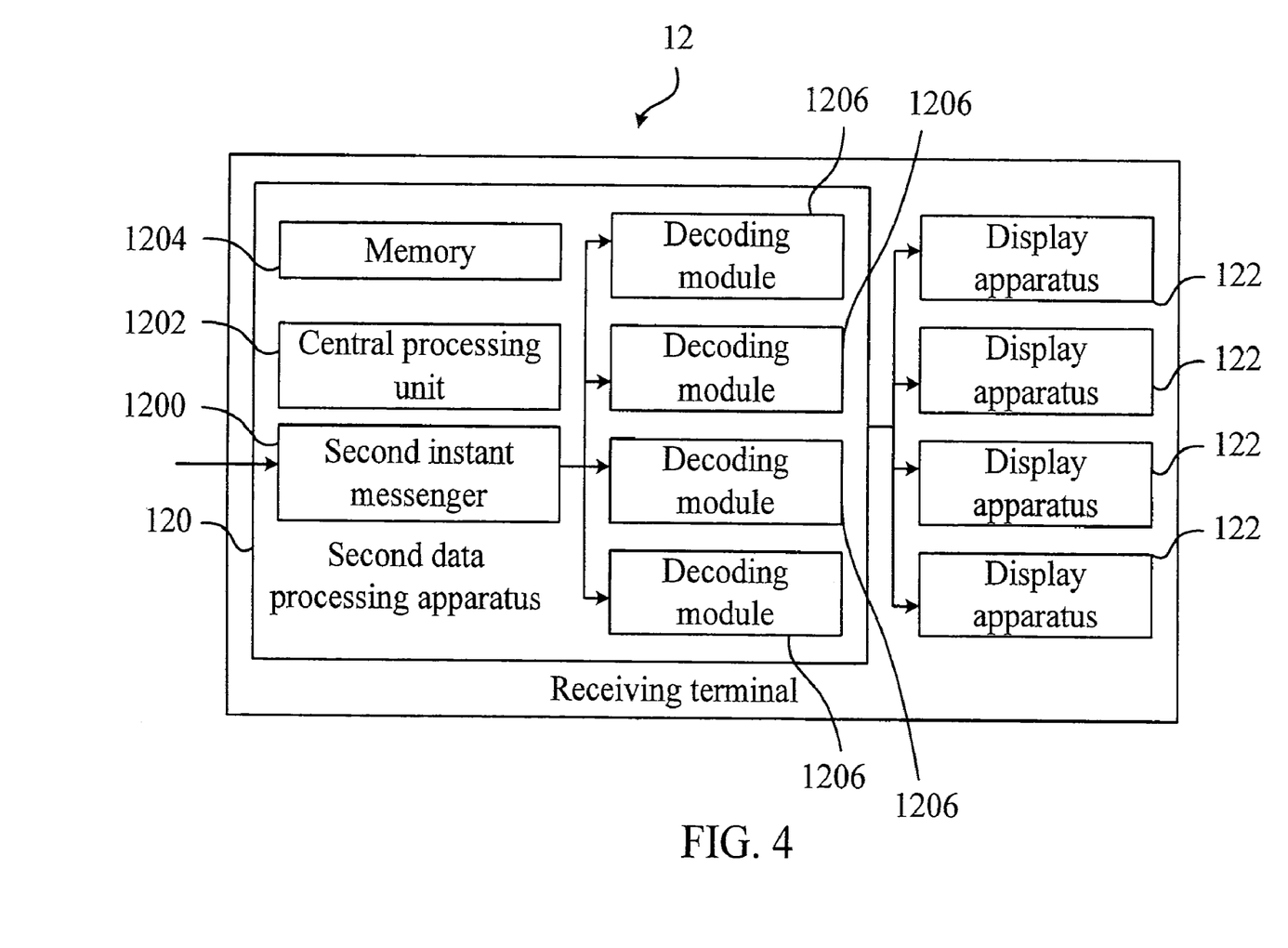
FIG. 4 is a functional block diagram illustrating the receiving terminal depicted in FIG. 1.

Please refer to FIG. 4. FIG. 4 is a functional block diagram illustrating the receiving terminal 12 shown in FIG. 1. The second data processing apparatus 120 of the receiving terminal 12 further comprises a central processing unit 1202, a memory 1204, and four decoding modules 1206. The central processing unit 1202 and the memory 1204 are well known and the functions of them do not be mentioned here. Each decoding module 1206 respectively corresponds to one of the transmitting terminals 10 and is used for decoding the standard-format communication image transmitted from the corresponding transmitting terminal 10 into the high definition image. Afterward, each of the display apparatuses 122 respectively displays the corresponding high definition image.

Figure 5:
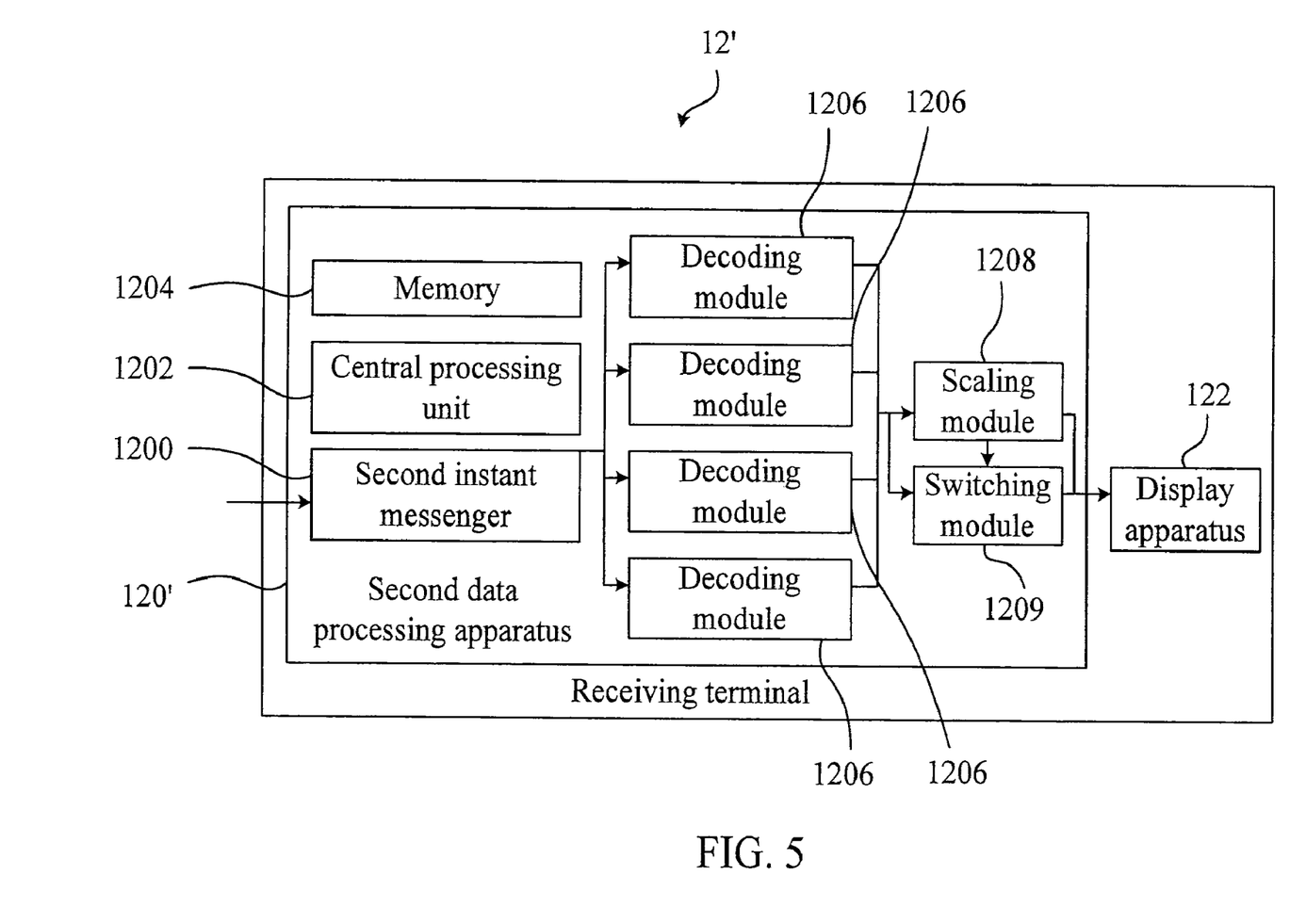
FIG. 5 is a functional block diagram illustrating the receiving terminal according to another preferred embodiment of this invention.

The invention also can utilize single display apparatus 122 to display the high definition image transmitted from each transmitting terminal 10 shown in FIG. 1. Please refer to FIG. 5. FIG. 5 is a functional block diagram illustrating the receiving terminal 12' according to another preferred embodiment of the invention. The main difference between the second data processing apparatus 120' and the second data processing apparatus 120 is that the second data processing apparatus 120' further comprises a scaling module 1208 and a switching module 1209.

Figure 6A:
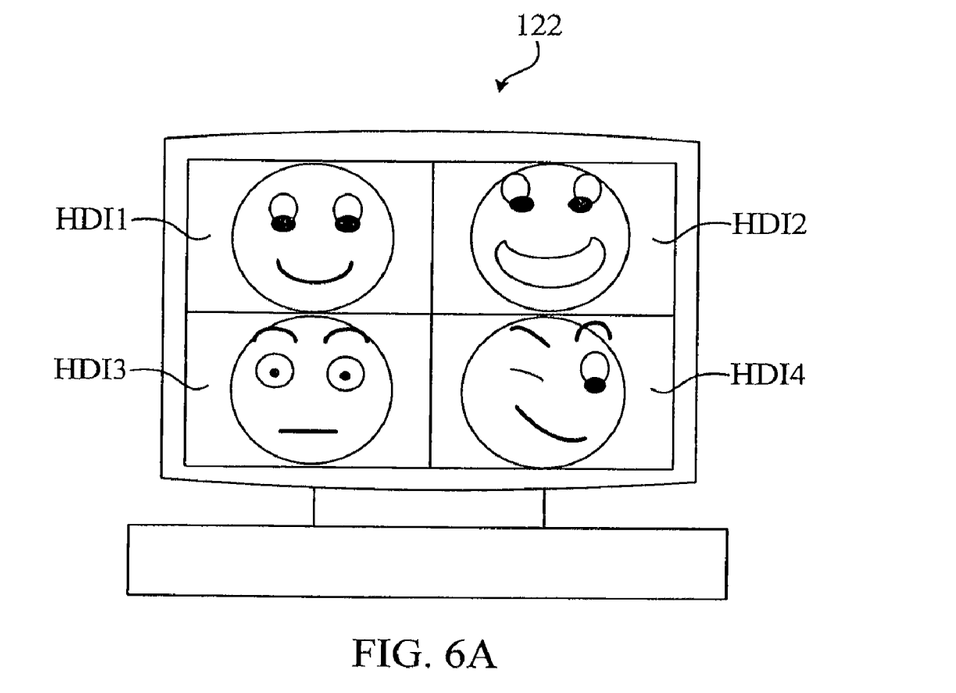
FIG. 6A is a schematic diagram illustrating four high definition images displayed by display apparatus depicted in FIG. 5.
Figure 6B:
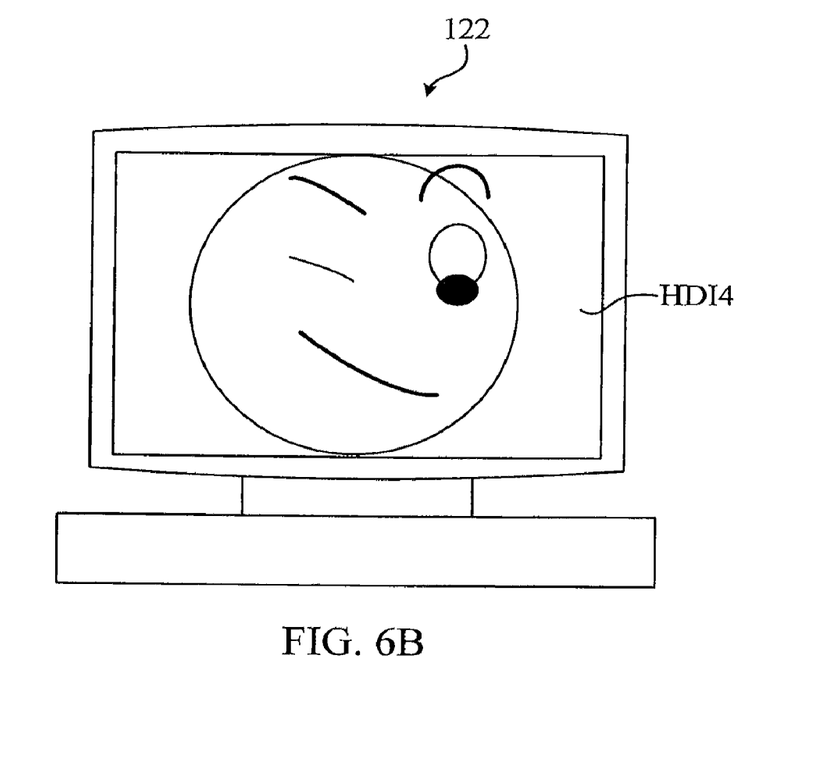
FIG. 6B is a schematic diagram illustrating a high definition image is switched to full screen mode depicted in FIG. 6A.

Please refer to FIG. 6A and FIG. 6B. FIG. 6A is a schematic diagram illustrating four high definition images HDI1-HDI4 displayed by the display apparatus 122 shown in FIG. 5. FIG. 6B is a schematic diagram illustrating the high definition image HDI4, shown in FIG. 6A, switched to full screen mode. The scaling module 1208 scales the high definition images decoded by the decoding modules 1206 according to resolution of the display apparatus 122, such that the scaled high definition images are capable of being simultaneously displayed on single display apparatus 122. As shown in FIG. 6A, each high definition image HDI1-HDI4 is scaled to ¼ of the original image and simultaneously displayed on the display apparatus 122. The switching module 1209 is used for selectively switching the scaled high definition images or one of the decoding modules to full screen mode. As shown in FIG. 6B, when a viewer wants to see a participant corresponding to the high definition image HDI4, or a participant corresponding to the high definition image HDI4 is speaking, the high definition image HDI4 could be switched to full screen mode through the switching module 1209.

Furthermore, the receiving terminal 12' also could further transmit the scaled images with ¼ size (as shown in FIG. 6A) or the full screen mode (as shown in FIG. 6B) to each of the transmitting terminals 10 through the pipeline 14. Therefore, not only the receiving terminal 12' but also each of the transmitting terminals 10 can show all participants or a specific participant in full screen mode.

Compared with the prior art, the high definition video conference system of the invention compresses an image according a high definition compression standard by utilizing an encoding module embedded in transmitting terminal. Accordingly, users can use the transmitting terminal to form images and process high definition images, so as to achieve high definition video conference. Besides, because the amount of high definition image compressed by the encoding module is much smaller than those without compression, it could reduce the load of follow-up transmission and process. Consequently, the high definition video conference system of the invention can easily provide high definition image in real time for multiple participants.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A high definition video conference system, comprising:
   a plurality of transmitting terminals, each transmitting terminal comprising: a digital imaging/processing apparatus for capturing an image and compressing the image into a high definition image, wherein the digital imaging/processing apparatus comprises an image sensing module for sensing the image and an encoding module for compressing the image into the high definition image according to a high definition compression standard; and
   a first data processing apparatus for converting the high definition image into a standard-format communication image according to a standard communication protocol and then transmitting the standard-format communication image; and
   a receiving terminal, comprising:

a second data processing apparatus for receiving and decoding the standard-format communication image transmitted from each transmitting terminal into the high definition image, wherein the second data processing apparatus comprises:

a plurality of decoding modules, and each of the decoding modules respectively corresponds to one of the transmitting terminals and is used for decoding the standard-format communication image transmitted from the corresponding transmitting terminal into the high definition image;

a scaling module for scaling the high definition images decoded by the decoding modules according to resolution of the display apparatus, such that the scaled high definition images are capable of being simultaneously displayed on single display apparatus; and a switching module for selectively switching the scaled high definition images or one of the decoding modules to full screen mode; and at least one display apparatus for displaying the high definition image.

2. The high definition video conference system of claim 1, wherein the high definition compression standard is one selected from a group consisting of MPEG-2, MPEG-4 and H.264.

3. The high definition video conference system of claim 1, wherein a pipeline is established between a first instant messenger of the first data processing apparatus and a second instant messenger of the second data processing apparatus, and the standard-format communication image is transmitted through the pipeline.

4. The high definition video conference system of claim 3, wherein the first instant messenger or the second instant messenger is one selected from a group consisting of AOL AIM Instant Messenger, Microsoft MSN Messenger, Yahoo! Messenger, ICQ, Jabber, Groove and Sun JXTA.

5. The high definition video conference system of claim 1, wherein the at least one display apparatus comprises a plurality of display apparatuses, and each of the display apparatuses respectively corresponds to one of the decoding modules and is used for displaying the corresponding high definition image.

6. The high definition video conference system of claim 1, wherein the receiving terminal further transmits the scaled high definition images or an image in full screen mode to the transmitting terminals through the pipeline.

7. The high definition video conference system of claim 1, wherein the standard-format communication protocol is a session initiation protocol or a H.323 protocol.

* * * * *

UNITED STATES PATENT AND TRADEMARK OFFICE
CERTIFICATE OF CORRECTION

| | | |
|---|---|---|
| PATENT NO. | : 8,194,114 B2 | Page 1 of 1 |
| APPLICATION NO. | : 11/984157 | |
| DATED | : June 5, 2012 | |
| INVENTOR(S) | : Barry Lam et al. | |

It is certified that error appears in the above-identified patent and that said Letters Patent is hereby corrected as shown below:

Title Page (items 12 and 75)
In the Inventor section on the face of the issued patent all of the inventor names are transposed. The names should read Barry Lam, Chee-Chun Leung, Chia-Yuan Chang, Hsueh-Cheng Hsu.

In the Description section, the first inventor's last name "Lam" should appear instead of his first name "Barry".

Signed and Sealed this
Fourteenth Day of August, 2012

David J. Kappos
*Director of the United States Patent and Trademark Office*